(12) United States Patent
Yuan

(10) Patent No.: US 11,837,017 B2
(45) Date of Patent: Dec. 5, 2023

(54) SYSTEM AND METHOD FOR FACE RECOGNITION BASED ON DYNAMIC UPDATING OF FACIAL FEATURES

(71) Applicant: ESPRESSIF SYSTEMS (SHANGHAI) CO., LTD., Shanghai (CN)

(72) Inventor: Jiong Yuan, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 213 days.

(21) Appl. No.: 17/201,677

(22) Filed: Mar. 15, 2021

(65) Prior Publication Data
US 2021/0312166 A1  Oct. 7, 2021

(30) Foreign Application Priority Data

Mar. 13, 2020  (CN) .......................... 202010173164.X

(51) Int. Cl.

| | |
|---|---|
| *G06K 9/36* | (2006.01) |
| *G06K 9/62* | (2022.01) |
| *G06V 40/16* | (2022.01) |
| *G06N 3/08* | (2023.01) |
| *G06T 3/00* | (2006.01) |
| *G06T 5/00* | (2006.01) |
| *G06V 40/50* | (2022.01) |
| *G06V 10/74* | (2022.01) |

(Continued)

(52) U.S. Cl.
CPC .............. *G06V 40/166* (2022.01); *G06N 3/08* (2013.01); *G06T 3/0006* (2013.01); *G06T 5/002* (2013.01); *G06V 10/30* (2022.01); *G06V 10/32* (2022.01); *G06V 10/761* (2022.01); *G06V 10/764* (2022.01); *G06V 10/82* (2022.01); *G06V 40/168* (2022.01); *G06V 40/172* (2022.01); *G06V 40/50* (2022.01); *G06F 2218/04* (2023.01)

(58) Field of Classification Search
CPC .................. G06V 40/16–40/179; G06V 40/50
See application file for complete search history.

(56) References Cited

U.S. PATENT DOCUMENTS

2015/0092996 A1 *  4/2015 Tian .................... G06V 40/171
                                                              382/118
2020/0279101 A1 *  9/2020 Zhao ........................ G06T 7/11

* cited by examiner

*Primary Examiner* — Brian Werner
(74) *Attorney, Agent, or Firm* — Aird & McBurney LP

(57) ABSTRACT

Disclosed is a system for face recognition based on dynamic updating of facial features, comprising an image acquisition unit, a face image standardization unit, a facial feature comparison unit, and a facial feature update unit. The image acquisition unit acquires an original image which is processed by the face image standardization unit, and then the facial feature comparison unit completes extraction and comparison of a facial feature vector to determine whether the original image belongs to a user ID or a stranger, or to complete entry of the facial feature vector. Each user ID corresponds to one or more facial feature vectors. The facial feature update unit automatically updates the facial feature vector in a normal workflow to improve reliability and accuracy of face recognition. Also disclosed is a method for face recognition using the system. The disclosure has the advantages of simple deployment and simple to use, improving the accuracy of face recognition without increasing the size of a face recognition network, and may quickly and effectively adapt to changes in environment or user's appearance.

20 Claims, 2 Drawing Sheets

(51) Int. Cl.
*G06V 10/764* (2022.01)
*G06V 10/82* (2022.01)
*G06V 10/32* (2022.01)
*G06V 10/30* (2022.01)

SYSTEM AND METHOD FOR FACE RECOGNITION BASED ON DYNAMIC UPDATING OF FACIAL FEATURES

TECHNICAL FIELD

The present disclosure relates to the field of face recognition, in particular to systems and methods for face recognition based on dynamic update of facial features.

BACKGROUND ART

With the development of deep learning and computer vision, the accuracy of face recognition has been becoming higher and higher, and the face recognition network is getting bigger and bigger. How to run a system for accurate face recognition on mobile devices with extremely limited computing resources has become a difficult problem.

A big challenge for the systems for face recognition is that unlike fingerprint, face may change over time. Different recognition angles, different glasses, different hairstyles, and different makeup may affect judgment of the systems for face recognition.

At present, there are also some successful systems for face recognitions, such as Apple's system for face recognition. With the help of 3D structured light (special hardware), Apple's system for face recognition may carry out 3D modeling of a face and get more face information, and uses a neural network accelerator to accelerate a face recognition model. However, the good results produced by such a system are accompanied with high cost and high complexity of implementation. Alipay's face recognition technology has also achieved good results, but such technology is based on online face recognition, and face information will be sent to a server side for comparison. Therefore, there is almost no constraint on computing resources.

How to effectively improve recognition performance on the premise of keeping the network size unchanged is very important for devices with limited computing resources. Increasing the size of the face recognition network may reduce impact of face transformation on system performance to a certain extent, but may also result in more computation, and the relationship between the model size and performance is often non-linear. Improving the performance a little bit tends to increase the amount of computation several times. In order to deal with the changing face without increasing the amount of computation, it is a feasible way to update facial features at appropriate times.

Some systems may replace the facial features with the extracted face vectors after each successful recognition, but such replacement may not guarantee that the face vectors updated each time are representative.

SUMMARY OF THE INVENTION

The present disclosure provides a system and a method for face recognition based on dynamic update of facial features, which may solve at least some problems of the prior art. The present disclosure discloses an efficient and accurate face recognition scheme suitable for actual scenarios, and may not reduce recognition performance over time.

Accordingly, the technical solution adopted by the present disclosure is to provide a system for face recognition based on dynamic updating of facial features which comprises an image acquisition unit, a face image standardization unit, a facial feature comparison unit, and a facial feature update unit;

the image acquisition unit acquires an original image for face recognition, and transmits the image to the face image standardization unit after preprocessing;

the face image standardization unit standardizes the image preprocessed by the image acquisition unit to acquire a unified, standardized input image as an input to the facial feature comparison unit;

the facial feature comparison unit comprises a facial feature extraction module, a facial feature comparison module, and a face ID library; information stored in the face ID library comprises a plurality of user IDs, a plurality of prestored facial feature sets, and a correspondence table for recording one-to-one mapping relationship between the plurality of user IDs and the plurality of prestored facial feature sets; each of the plurality of the prestored facial feature sets comprises one or more prestored feature vectors;

the facial feature comparison unit takes the standardized input image as the input, extracts the feature vector to be detected from the standardized input image by using the facial feature extraction module, and then traverses the plurality of prestored facial feature sets by using the facial feature comparison module to calculate a candidate similarity between each of the plurality of prestored facial feature sets and the feature vector to be detected, and determines whether a face corresponding to the standardized input image corresponds to a user ID in the face ID library according to the candidate similarity, the correspondence table, and a face recognition threshold; and the facial feature update unit is configured to add or update the prestored feature vector in a prestored facial feature set corresponding to the user ID.

Further, the facial feature comparison unit traverses the plurality of prestored facial feature sets by using the facial feature comparison module, and calculates the candidate similarity between each of the prestored facial feature sets and the feature vector to be detected;

when the candidate similarity is greater than the face recognition threshold, the user ID corresponding to the prestored facial feature set and the candidate similarity are added to a candidate list according to the correspondence table; if the candidate list is empty after traversing, the face corresponding to the standardized input image is determined to be a stranger; otherwise, the user ID corresponding to a highest similarity is selected from the candidate list, and the face corresponding to the standardized input image is determined to correspond to the user ID.

Further, the facial feature comparison unit traverses the plurality of prestored facial feature sets by using the facial feature comparison module, calculates the candidate similarity between each of the plurality of prestored facial feature sets and the feature vector to be detected, and selects a highest similarity from all the candidate similarities; when the highest similarity is greater than the face recognition threshold, the user ID corresponding to the highest similarity is selected according to the correspondence table, and the face corresponding to the standardized input image is determined to correspond to the user ID; otherwise, the standardized input image is determined to be a stranger.

Further, the image acquisition unit comprises an image acquisition module, and an image preprocessing module;

the image acquisition module acquires the original image for face recognition; and the image preprocessing module selectively carries out image preprocessing operations on the original image according to quality of the original image.

Further, the image preprocessing operations comprise denoising, color correction, and illumination correction.

Further, the face image standardization unit comprises a face detection module, a face alignment module, and a face preprocessing module;
  the face detection module determines whether there is a face to be detected in the original image, and if so, the face detection module finds out a location of the face and obtains coordinates of key points of the face;
  the face alignment module aligns the face to be detected in the original image according to the coordinates of the key points of the face to obtain an aligned face image; and
  the face preprocessing module performs face data normalization and data format conversion on the aligned face image to obtain the standardized input image.

Further, the face alignment module uses similarity transformation or affine transformation to obtain the aligned face image.

Further, the facial feature comparison unit further comprises a face entry module;
  when there is an entry request, if a number of faces calculated according to the location of the face is greater than 1, or a face angle calculated from the coordinates of the key points of the face is significantly lateral, the face entry module determines that an entry condition is not met and no entry is performed; otherwise, the entry condition is determined to be met and a user is required to provide a user ID to be entered; and the face entry module takes the extracted feature vector to be detected as a first prestored feature vector of the prestored facial feature set, establishes a mapping between the prestored facial feature set and the user ID to be entered, updates the correspondence table, and finally stores the prestored facial feature set, the user ID to be entered, and the updated correspondence table in the face ID library.

Further, the facial feature update unit comprises a feature update prejudgment module, a feature update module, and a feature diversity evaluation module;
  the feature update prejudgment module selects a highest similarity and a second highest similarity from all the candidate similarities obtained by the facial feature comparison unit; if there is only one candidate similarity, the highest similarity is equal to the candidate similarity, and the second highest similarity is 0; if the highest similarity is greater than a specified first threshold, and the second highest similarity is lower than a specified second threshold, the feature vector to be detected and the prestored facial feature set are sent into the feature update module as input; the first threshold is not less than the second threshold;
  after receiving the input, if a number of feature vectors stored in the prestored facial feature set does not reach a preset upper limit for the number of feature vectors, the feature update module directly adds the feature vector to be detected to the prestored facial feature set; if the number of stored feature vectors has reached the upper limit for the number of feature vectors, each of the prestored feature vectors in the prestored facial feature set, except one or more front facial feature vectors, is replaced with the feature vector to be detected in turn; a candidate facial feature set is obtained by each replacement; a diversity score for each of the candidate facial feature set is calculated by the feature diversity evaluation module, and a candidate facial feature set with the highest score is selected therefrom; if the diversity score for the candidate facial feature set with the highest score is higher than the diversity score for the original prestored facial feature set, the candidate facial feature set with the highest score is taken as a new prestored facial feature set; otherwise, the prestored facial feature set is not updated; and
  the feature diversity evaluation module obtains a diversity score for the prestored facial feature set or the candidate facial feature set.

Further, the feature diversity evaluation module takes the prestored facial feature set or the candidate facial feature set as a vector group, and then obtains the diversity score in one of the following three manners:
  manner 1) taking a mean Euclidean distance between each feature vector in the vector group and a mean vector of all feature vectors in the vector group as the diversity score;
  manner 2) taking a mean of all vector similarities between any two of all feature vectors in the vector group as the diversity score; and
  manner 3) training a shallow neural network to generate the diversity score of the vector group.

Further, the facial feature comparison module calculates the candidate similarity in one of the following two manners:
  manner 1) taking a weighted mean of the vector similarities between the feature vector to be detected and each of the prestored feature vectors in the prestored facial feature set as the candidate similarity between the feature vector to be detected and the prestored facial feature set; and
  manner 2) taking a maximum of the vector similarities between the feature vector to be detected and each of the prestored feature vectors in the prestored facial feature set as the candidate similarity between the feature vector to be detected and the prestored facial feature set.

Further, the vector similarity comprises a cosine similarity or Euclidean similarity.

The present disclosure also provides a method for face recognition using the system for face recognition based on dynamic updating of facial features, and the method may include the following steps:
  step 101) using the image acquisition unit to acquire the original image, and preprocessing the original image to improve the accuracy of face recognition;
  step 102) using the face image standardization unit to standardize the preprocessed original image to obtain a unified, standardized input image;
  step 103) using the facial feature comparison unit to extract the feature vector to be detected from the standardized input image;
  step 104) traversing the plurality of prestored facial feature sets, calculating a candidate similarity between each of the plurality of prestored facial feature sets and the feature vector to be detected, and determining whether a face corresponding to the standardized input image corresponds to a user ID in the face ID library according to the candidate similarity, the correspondence table, and the face recognition threshold;
  step 105) if the standardized input image is determined to correspond to a stranger, proceeding to step 107; otherwise, proceeding to step 106;

step 106) deciding, by the facial feature update unit, whether the feature vector to be detected needs to be added or updated to the prestored facial feature set, and if yes, completing addition or update; and step 107) ending the face recognition.

Owing to the above technical features, the present disclosure has the following advantages:

In the present disclosure, a face/user ID is expressed through multi-feature information. The multi-feature information may better express the same ID in different states. In the recognition process, the present disclosure dynamically updates the feature information of an existing ID according to the principle of feature diversity, so that different feature information in the ID is representative. And angle information of the face at the time is predicted and analyzed by facial feature points to ensure that front facial feature information always exists in the facial feature. For comparison of the multi-feature information, the present disclosure also provides multiple ways for feature comparison.

The system has the following advantages:

1) The system may be deployed in a simple manner, and may be implemented based on a conventional system for face recognition through simple extension.
2) The accuracy of the system for face recognition is improved without increasing the size of a face recognition network thereby providing efficient use of the existing face recognition network.
3) The system is easy to use, requires no special setting and operation by the user, and the updating of all the features are fully automated.
4) When the operating environment or user makeup changes over time, the system may quickly and effectively adapt to such changes.

Figure 1:
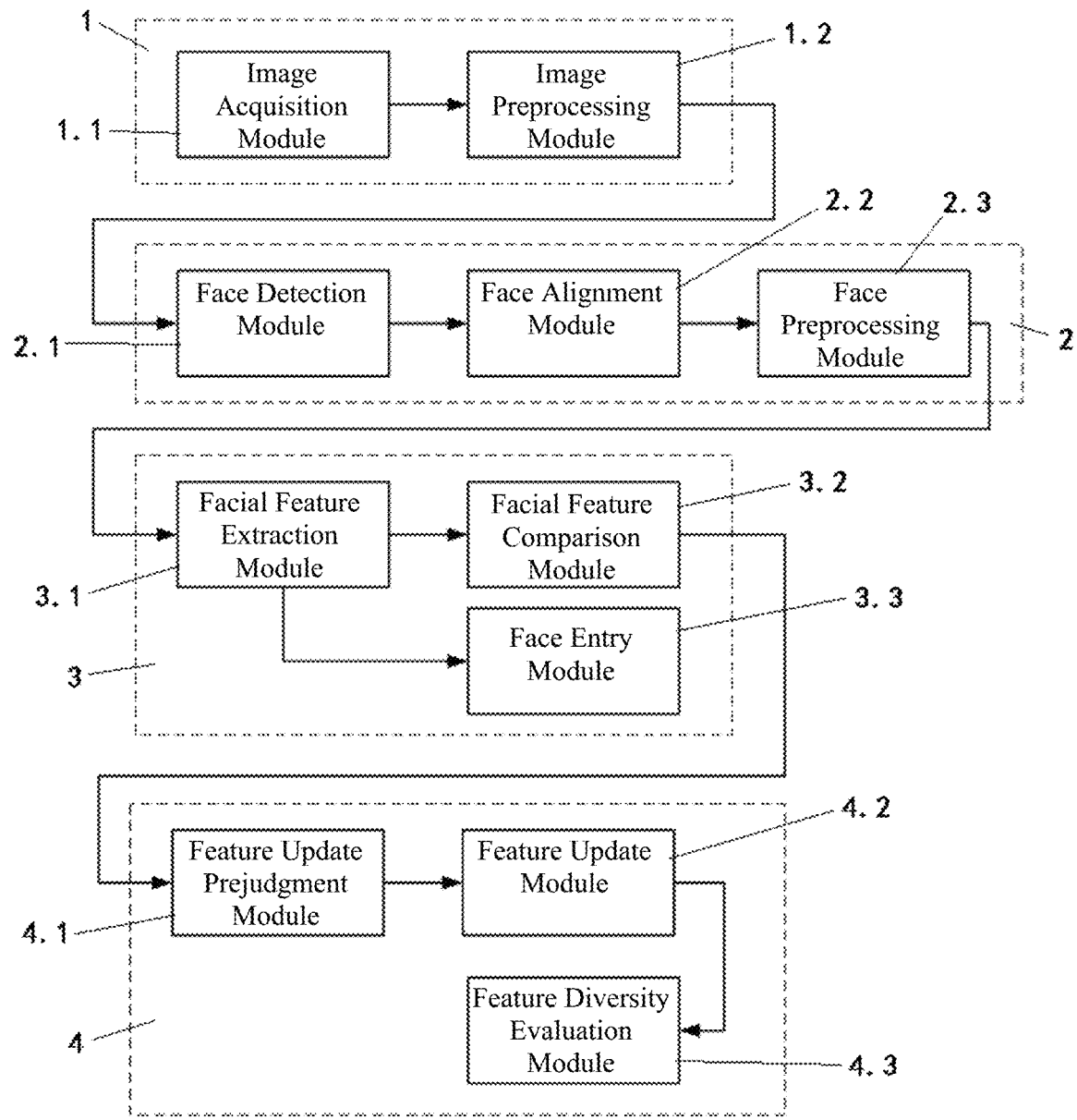
FIG. 1 is an illustrative system diagram of an embodiment of the system for face recognition of the present disclosure.

Reference numerals in the drawings: 1—image acquisition unit, 1.1—image acquisition module, and 1.2—image preprocessing module; 2—face image standardization unit, 2.1—face detection module, 2.2—face alignment module, and 2.3—face preprocessing module; 3—facial feature comparison unit, 3.1—facial feature extraction module, 3.2—facial feature comparison module, and 3.3—face entry module; and 4—facial feature update unit, 4.1—feature update prejudgment module, 4.2—feature update module, and 4.3—feature diversity evaluation module.

DETAILED DESCRIPTION OF THE PREFERRED EMBODIMENTS

The present disclosure will be further described below with reference to the specific embodiments. It should be appreciated that these embodiments are provided for the purpose of illustrating the present disclosure only and are not intended to limit the scope thereof. In addition, it should be understood that after reading the contents taught by the present disclosure, those skilled in the art may make various changes and modifications to the present disclosure, and the equivalent thereof shall also fall within the scope defined by the appended claims of the present disclosure.

With reference to FIG. 1, a system for face recognition based on dynamic updating of facial features of the present embodiment may comprise an image acquisition unit 1, a face image standardization unit 2, a facial feature comparison unit 3, and a facial feature update unit 4.

An original image is acquired by the image acquisition unit 1 and further processed by the face image standardization unit 2 to obtain a standard input to the facial feature comparison unit 3. The facial feature comparison unit 3 completes extraction and comparison of a facial feature vector to determine whether the original image belongs to a user ID or a stranger. The facial feature comparison unit 3 may also provide a facial feature vector input of the user ID. The facial feature update unit 4, combined with the facial feature comparison unit 3, completes automatic update of the facial feature vector in a normal workflow to improve reliability and accuracy of face recognition.

The image acquisition unit 1 may consist of an image acquisition module 1.1 and an image preprocessing module 1.2. The image acquisition module 1.1 may be configured to obtain the original image for face recognition. The image preprocessing module 1.2 may, according to image quality of the original image acquired by the image acquisition module 1.1, selectively carry out image processing operations such as denoising, color correction, and illumination correction on the original images to facilitate subsequent detection and recognition.

The face image standardization unit 2 may consist of a face detection module 2.1, a face alignment module 2.2 and a face preprocessing module 2.3. The face detection module 2.1 may be configured to determine whether there is a face in the original image, and find out a location of the face and coordinates of key points of the face. The face alignment module 2.2 may align the face according to the coordinates of the key points of the face by the specific alignment method as selected according to needs of the feature extraction module, such as similarity transformation and affine transformation. The face preprocessing module 2.3 may process the aligned face image to conform to an input format required by the feature extraction module and obtain the standardized input image. The specific processing method may comprise face data normalization, data format conversion and other operations.

The facial feature comparison unit 3 may consist of the facial feature extraction module 3.1, a facial feature comparison module 3.2, a face entry module 3.3, and a face ID library.

Information stored in the face ID library may comprise a plurality of user IDs, a plurality of prestored facial feature sets, and a correspondence table for recording one-to-one mapping relationship between the plurality of user IDs and the plurality of prestored facial feature sets; and each of the plurality of prestored facial feature sets may comprise at least one prestored feature vector.

The facial feature extraction module 3.1 may be configured to extract facial feature vectors, and is composed of a neural network. The standardized input image is converted into a high-dimensional vector after passing through the module, and the high-dimensional vector is unitized to obtain a vector as a representation of the input face (feature vector to be detected).

The facial feature comparison module 3.2 may be configured to perform comparison between the feature vector to be detected and data in the face ID library to obtain a corresponding similarity (i.e., candidate similarity), and determine wither the face corresponding to the standardized input image corresponds to a user ID in the face ID library, according to the candidate similarity and the correspondence table. In the present embodiment, as one user ID can correspond to more than one facial feature vector, the similarity may be measured between a feature vector to be detected and a vector group composed of one or more prestored facial feature vectors in various manners, and the specific form of the measurements of the similarity may include:

1) a weighted mean of the vector similarities between the feature vector to be detected and each of multiple prestored facial feature vectors corresponding to each user ID is taken as the candidate similarity between the feature vector to be detected and the user ID; and
2) a maximum of the vector similarities between the feature vector to be detected and each of multiple prestored facial feature vectors corresponding to each user ID is taken as the candidate similarity between the feature vector to be detected and the user ID.

Of which, cosine similarity (cos<x1, x2>) or Euclidean similarity (1−‖x1, x2‖) may be used to calculate the vector similarity between the feature vector to be detected and each of the prestored facial feature vectors.

The specific way to determine whether the face is a stranger may comprise traversing the data in the face ID library, and calculating the candidate similarity between the feature vector to be detected and each of the plurality of prestored facial feature sets in the face ID library; when the candidate similarity is greater than the face recognition threshold, adding the user ID corresponding to the prestored facial feature set and the candidate similarity to the candidate list, according to the correspondence table; determining that the face belongs to a stranger if the candidate list is empty after traversing; otherwise, selecting a user ID corresponding to a highest similarity and determining that the face corresponding to the input corresponds to the user ID.

The specific way to determine whether the face is a stranger may also comprise traversing the data in the face ID library, calculating the candidate similarity between the feature vector to be detected and each of the plurality of prestored facial feature sets in the face ID library, and selecting the highest similarity therefrom; when the highest similarity is greater than the face recognition threshold, selecting the user ID corresponding to the highest similarity according to the correspondence table, and determining that the face corresponding to the standardized input image corresponds to the user ID; otherwise, determining that the face corresponds to a stranger.

In some embodiments, after the candidate similarity between the feature vector to be detected and each of the plurality of prestored facial feature sets in the face ID library is calculated, the highest similarity and a second highest similarity corresponding to the feature vector to be detected may be determined.

The face entry module 3.3 may be configured for face entry. When there is an entry request, the face entry module 3.3 may determine whether to enter the face according to the position of the face and the coordinates of the key points of the face provided by the face detection module 2.1. If the number of faces is greater than 1, or a face angle calculated from the coordinates of the key points of the aligned face is significantly lateral, it may be determined that the environment does not meet the entry condition; otherwise, it may be determined that the environment meets the entry condition. If the entry condition is met, the user ID provided by the user may be bonded with the facial feature vector extracted by the facial feature extraction module 3.1 at this time to establish a mapping relationship, that is, the feature vector to be detected becomes a prestored feature vector in a prestored facial feature set corresponding to the user ID.

The facial feature update unit 4 may consist of a feature update prejudgment module 4.1, a feature update module 4.2 and a feature diversity evaluation module 4.3.

The feature update prejudgment module 4.1 may be configured to determine whether the feature vector to be detected needs to be updated to the prestored facial feature set. If necessary, the feature vector to be detected may be sent to the feature update module for preliminary screening of facial feature update. A simple way of such determination may be based on the output of the facial feature comparison module 3.2. If the highest similarity between the feature vector to be detected and the prestored facial feature sets in the face ID library is greater than a first threshold set by the feature update prejudgment module 4.1, and the second highest similarity is lower than a second threshold, the feature vector to be detected and the corresponding prestored facial feature set may be sent to the feature update module 4.2. The first threshold may be different from the second threshold, and the first threshold is not less than the second threshold. The first threshold may be equal to the face recognition threshold.

The feature update module 4.2 may be configured to decide and implement the facial feature update. If the number of the prestored feature vectors stored in the prestored facial feature set does not exceed a preset number of features for each user ID, the feature vector to be detected at this time may be directly added to the prestored facial feature set. If the number of the prestored feature vectors stored in the prestored facial feature set has reached a preset upper limit, each of the prestored feature vectors in the prestored facial feature set, except the front facial feature vectors, may be replaced with the feature vector to be detected in turn, and the feature vector to be detected is sent to the feature diversity evaluation module 4.3 to obtain a feature diversity score. If a highest feature diversity score is higher than the feature diversity score for the original prestored facial feature set, a feature vector combination corresponding to the highest feature diversity score may be used as a new feature vector combination of the user ID (replacing the original prestored facial feature set); otherwise, the feature vector combination is not updated, and the original prestored facial feature set is still used as the feature vector combination corresponding to the user ID.

The feature diversity evaluation module 4.3 may be configured to generate the diversity score of a feature set. The lower the diversity score among the feature vectors in a feature set, the higher the similarity between the feature vectors, and each feature vector may not be representative, which means that there exists redundancy in the feature set. From the perspective of face recognition reliability, the feature set (multiple feature vector combinations) corresponding to the same user ID needs to be representative, because the feature set represents the same person in different lighting environments, different makeup, and/or different postures, for example. At this point, the feature vector combinations will have high diversity. The feature diversity evaluation module 4.3 may quantify the diversity according to specified standards or methods. The feature diversity evaluation module 4.3 may be implemented in various manners, including but not limited to:

1) taking a mean Euclidean distance between each feature vector in the vector group and a mean vector of the vector group as the diversity score;
2) taking a mean of all similarities between any two of vectors in the vector group as the diversity score; and
3) training a shallow neural network to generate the diversity score of the vector group.

Of which, cosine similarity (cos<x1, x2>) or Euclidean similarity (1−‖x1, x2‖) may be used to calculate the vector similarity between two facial feature vectors.

Figure 2:
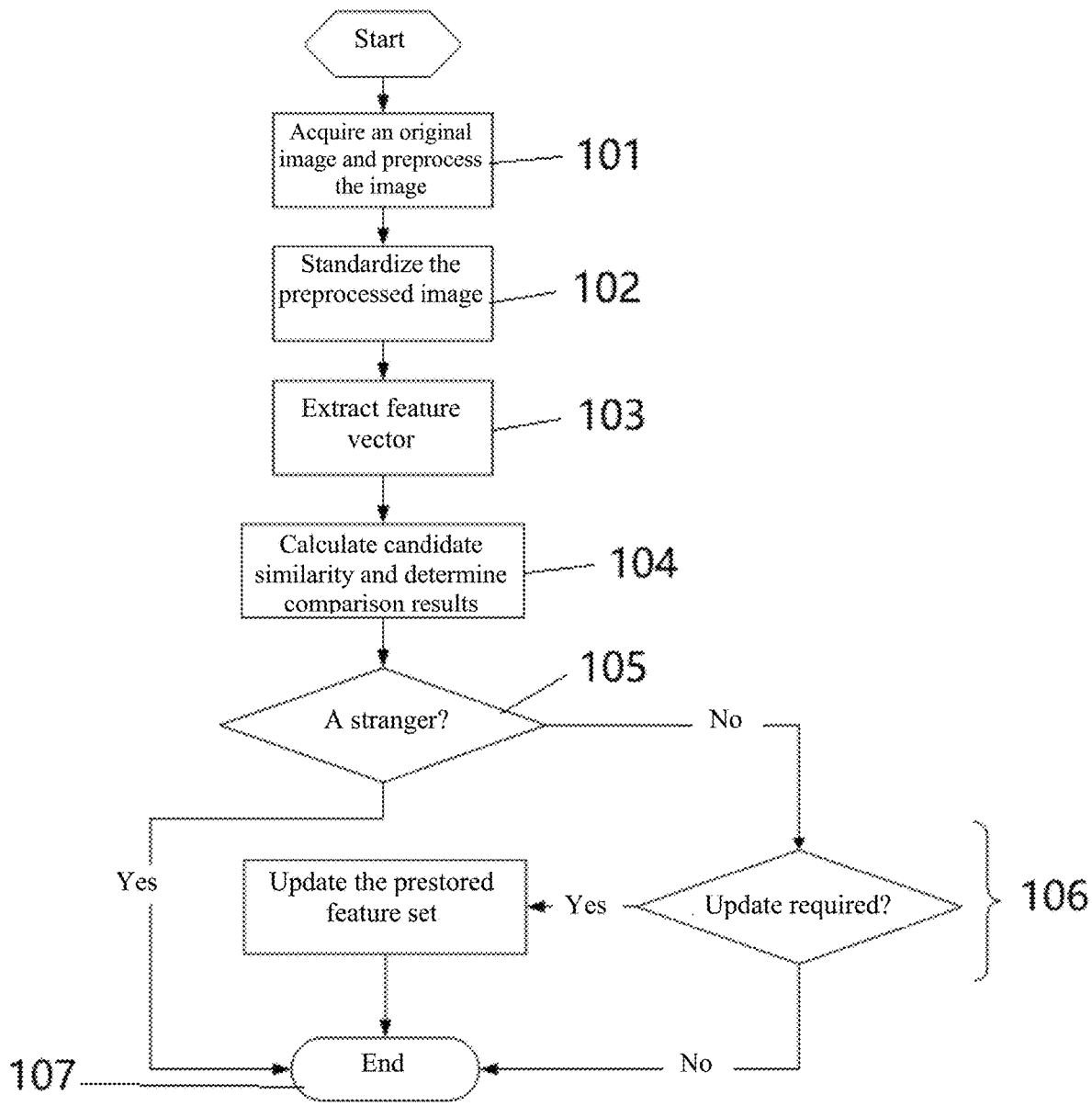
FIG. 2 is a flow chart of face recognition by the system for face recognition of the present disclosure.

With reference to FIG. 2, the present embodiment further provides a method for face recognition using the system for face recognition, comprising the following steps:

step 101) using the image acquisition unit to acquire the original image, and preprocessing the original image to improve the accuracy of face recognition;

step 102) using the face image standardization unit to standardize the preprocessed original image to obtain a unified, standardized input image;

step 103) using the facial feature comparison unit to extract the feature vector to be detected from the standardized input image;

step 104) traversing the plurality of prestored facial feature sets, calculating a candidate similarity between each of the plurality of prestored facial feature sets and the feature vector to be detected, and determining whether a face corresponding to the standardized input image corresponds to a user ID in the face ID library according to the candidate similarity, the correspondence table, and the face recognition threshold;

step 105) if the standardized input image is determined to correspond to a stranger, proceeding to step 107; otherwise, proceeding to step 106;

step 106) deciding whether the feature vector to be detected needs to be added or updated to the prestored facial feature set, and if yes, completing addition or update; and step 107) ending the face recognition.

The above description describes preferred embodiments of the present disclosure only, and therefore does not limit the patent scope of the present disclosure. All equivalent structures or equivalent process changes made in view of the specification and drawings of the present disclosure, or direct or indirect application to other related technical fields, shall be incorporated into the patent protection scope of the present disclosure.

The invention claimed is:

1. A system for face recognition based on dynamic updating of facial features, comprising an image acquisition unit, a face image standardization unit, a facial feature comparison unit, and a facial feature update unit;

the image acquisition unit acquiring an original image for face recognition, and transmitting the image to the face image standardization unit after preprocessing;

the face image standardization unit standardizing the image preprocessed by the image acquisition unit to acquire a unified, standardized input image as an input to the facial feature comparison unit;

the facial feature comparison unit comprising a facial feature extraction module, a facial feature comparison module, and a face ID library; information stored in the face ID library comprising a plurality of user IDs, a plurality of prestored facial feature sets, and a correspondence table for recording one-to-one mapping relationship between the plurality of user IDs and the plurality of prestored facial feature sets; each of the plurality of the prestored facial feature sets comprising one or more prestored feature vectors;

the facial feature comparison unit taking the standardized input image as the input, extracting a feature vector to be detected from the standardized input image by using the facial feature extraction module, and then traversing the plurality of prestored facial feature sets by using the facial feature comparison module to calculate a candidate similarity between each of the plurality of prestored facial feature sets and the feature vector to be detected, and determining whether a face corresponding to the standardized input image corresponds to a user ID in the face ID library according to the candidate similarity, the correspondence table, and a face recognition threshold; and the facial feature update unit being configured to add or update the prestored feature vector in a prestored facial feature set corresponding to the user ID;

wherein the facial feature comparison unit further comprises a face entry module; when there is an entry request, if a number of faces calculated according to the location of the face is greater than 1, or a face angle calculated from the coordinates of the key points of the face is significantly lateral, the face entry module determines that an entry condition is not met and no entry is performed; otherwise, the entry condition is determined to be met and a user is required to provide a user ID to be entered; and the face entry module takes the extracted feature vector to be detected as a first prestored feature vector of the prestored facial feature set, establishes a mapping between the prestored facial feature set and the user ID to be entered, updates the correspondence table, and finally stores the prestored facial feature set, the user ID to be entered, and the updated correspondence table in the face ID library.

2. The system for face recognition according to claim 1, wherein the facial feature comparison unit traverses the plurality of prestored facial feature sets by using the facial feature comparison module, and calculates the candidate similarity between each of the plurality of prestored facial feature sets and the feature vector to be detected; when the candidate similarity is greater than the face recognition threshold, the user ID corresponding to the prestored facial feature set and the candidate similarity are added to a candidate list according to the correspondence table; if the candidate list is empty after traversing, the face corresponding to the standardized input image is determined to be a stranger; otherwise, the user ID corresponding to a highest similarity is selected from the candidate list, and the face corresponding to the standardized input image is determined to correspond to the user ID.

3. The system for face recognition according to claim 1, wherein the facial feature comparison unit traverses the plurality of prestored facial feature sets by using the facial feature comparison module, calculates the candidate similarity between each of the plurality of prestored facial feature sets and the feature vector to be detected, and selects a highest similarity from all the candidate similarities; when the highest similarity is greater than the face recognition threshold, the user ID corresponding to the highest similarity is selected according to the correspondence table, and the face corresponding to the standardized input image is determined to correspond to the user ID; otherwise, the standardized input image is determined to be a stranger.

4. The system for face recognition according to claim 1, wherein the image acquisition unit comprises an image acquisition module, and an image preprocessing module;

wherein the image acquisition module acquires the original image for face recognition; and the image preprocessing module selectively carries out image preprocessing operations on the original image according to quality of the original image.

5. The system for face recognition according to claim 4, wherein the image preprocessing operations comprise denoising, color correction, and illumination correction.

6. The system for face recognition according to claim 1, wherein the face image standardization unit comprises a face detection module, a face alignment module, and a face preprocessing module;

the face detection module determines whether there is a face to be detected in the original image, and if so, the face detection module finds out a location of the face and obtains coordinates of key points of the face;

the face alignment module aligns the face to be detected in the original image according to the coordinates of the key points of the face to obtain an aligned face image; and the face preprocessing module performs face data normalization and data format conversion on the aligned face image to obtain the standardized input image.

7. The system for face recognition according to claim 6, wherein the face alignment module uses similarity transformation or affine transformation to obtain the aligned face image.

8. The system for face recognition according to claim 1, wherein the facial feature update unit comprises a feature update prejudgment module, a feature update module, and a feature diversity evaluation module;

the feature update prejudgment module selects a highest similarity and a second highest similarity from all the candidate similarities obtained by the facial feature comparison unit; if there is only one candidate similarity, the highest similarity is equal to the candidate similarity, and the second highest similarity is 0; if the highest similarity is greater than a specified first threshold, and the second highest similarity is lower than a specified second threshold, the feature vector to be detected and the prestored facial feature set are sent into the feature update module as input, wherein the first threshold is not less than the second threshold;

after receiving the input, if a number of feature vectors stored in the prestored facial feature set does not reach a preset upper limit for the number of feature vectors, the feature update module directly adds the feature vector to be detected to the prestored facial feature set; if the number of stored feature vectors has reached the upper limit for the number of feature vectors, each of the prestored feature vectors in the prestored facial feature set, except one or more front facial feature vectors, is replaced with the feature vector to be detected in turn; a candidate facial feature set is obtained by each replacement; a diversity score for each of the candidate facial feature set is calculated by the feature diversity evaluation module, and a candidate facial feature set with the highest score is selected therefrom; if the diversity score for the candidate facial feature set with the highest score is higher than the diversity score for the original prestored facial feature set, the candidate facial feature set with the highest score is taken as a new prestored facial feature set; otherwise, the prestored facial feature set is not updated; and the feature diversity evaluation module obtains a diversity score for the prestored facial feature set or the candidate facial feature set.

9. The system for face recognition according to claim 8, wherein the feature diversity evaluation module takes the prestored facial feature set or the candidate facial feature set as a vector group, and then obtains the diversity score in one of the following three manners:

manner 1) taking a mean Euclidean distance between each feature vector in the vector group and a mean vector of all feature vectors in the vector group as the diversity score;

manner 2) taking a mean of all vector similarities between any two of all feature vectors in the vector group as the diversity score; and manner 3) training a shallow neural network to generate the diversity score of the vector group.

10. The system for face recognition according to claim 1, wherein the facial feature comparison module calculates the candidate similarity in one of the following two manners:

manner 1) taking a weighted mean of the vector similarities between the feature vector to be detected and each of the prestored feature vectors in the prestored facial feature set as the candidate similarity between the feature vector to be detected and the prestored facial feature set; and manner 2) taking a maximum of the vector similarities between the feature vector to be detected and each of the prestored feature vectors in the prestored facial feature set as the candidate similarity between the feature vector to be detected and the prestored facial feature set.

11. The system for face recognition according to claim 9, wherein the vector similarity comprises a cosine similarity or Euclidean similarity.

12. The system for face recognition according to claim 10, wherein the vector similarity comprises a cosine similarity or Euclidean similarity.

13. A method for face recognition using the system for face recognition according to claim 1, comprising the following steps:

step 101) using the image acquisition unit to acquire the original image, and preprocessing the original image to improve an accuracy of face recognition;

step 102) using the face image standardization unit to standardize the preprocessed original image to obtain a unified, standardized input image;

step 103) using the facial feature comparison unit to extract the feature vector to be detected from the standardized input image;

step 104) traversing the plurality of prestored facial feature sets, calculating a candidate similarity between each of the plurality of prestored facial feature sets and the feature vector to be detected, and determining whether a face corresponding to the standardized input image corresponds to a user ID in the face ID library according to the candidate similarity, the correspondence table, and the face recognition threshold;

step 105) if the standardized input image is determined to correspond to a stranger, proceeding to step 107; otherwise, proceeding to step 106;

step 106) deciding, by the facial feature update unit, whether the feature vector to be detected needs to be added or updated to the prestored facial feature set, and if yes, completing addition or update; and when there is an entry request, determining, by a face entry module comprised in the facial feature comparison unit that an entry condition is not met and no entry is performed if a number of faces calculated according to the location of the face is greater than 1, or a face angle calculated from the coordinates of the key points of the face is significantly lateral; determining, otherwise, that the entry condition is met and a user is required to provide a user ID to be entered; and, taking, by the face entry module, the extracted feature vector to be detected as a first prestored feature vector of the prestored facial feature set, establishing a mapping between the prestored facial feature set and the user ID to be entered, updating the correspondence table, and finally storing the prestored facial feature set, the user ID to be entered, and the updated correspondence table in the face ID library;

step 107) ending the face recognition.

14. A method for face recognition, the method being executable by at least one processor, and comprising following steps:

acquiring an original image for face recognition, and preprocessing the original image to improve an accuracy of face recognition;

standardizing the preprocessed original image to obtain a unified, standardized input image;

extracting a feature vector to be detected from the standardized input image;

traversing a plurality of prestored facial feature sets to calculate a candidate similarity between each of the plurality of prestored facial feature sets and the feature vector to be detected, and determining whether a face corresponding to the standardized input image corresponds to a user ID in a face ID library according to the candidate similarity, a correspondence table, and a face recognition threshold;

in response to that there is an entry request, determining that an entry condition is not met and no entry is performed when a number of faces calculated according to the location of the face is greater than 1, or a face angle calculated from the coordinates of the key points of the face is significantly lateral; determining, otherwise, that the entry condition is met and a user is required to provide a user ID to be entered; and, taking the extracted feature vector to be detected as a first prestored feature vector of the prestored facial feature set, establishing a mapping between the prestored facial feature set and the user ID to be entered, updating the correspondence table, and finally storing the prestored facial feature set, the user ID to be entered, and the updated correspondence table in the face ID library.

15. The method for face recognition according to claim 14, further comprising:

traversing the plurality of prestored facial feature sets, and calculating the candidate similarity between each of the plurality of prestored facial feature sets and the feature vector to be detected;

in response to a determination that the candidate similarity is greater than the face recognition threshold, the user ID corresponding to the prestored facial feature set and the candidate similarity are added to a candidate list according to the correspondence table;

in response to a determination that the candidate list is empty after traversing, the face corresponding to the standardized input image is determined to be a stranger;

in response to a determination that the candidate list is not empty after traversing, the user ID corresponding to a highest similarity is selected from the candidate list, and the face corresponding to the standardized input image is determined to correspond to the user ID.

16. The method for face recognition according to claim 14, further comprising:

traversing the plurality of prestored facial feature sets, calculating the candidate similarity between each of the plurality of prestored facial feature sets and the feature vector to be detected, and selecting a highest similarity from all the candidate similarities;

in response to a determination that the highest similarity is greater than the face recognition threshold, the user ID corresponding to the highest similarity is selected according to the correspondence table, and the face corresponding to the standardized input image is determined to correspond to the user ID;

in response to a determination that the highest similarity is not greater than the face recognition threshold, the standardized input image is determined to be a stranger.

17. The method for face recognition according to claim 14, further comprising:

determining whether there is a face to be detected in the original image, and in response to a determination that there is a face to be detected in the original image, finding out a location of the face and obtains coordinates of key points of the face;

aligning the face to be detected in the original image according to the coordinates of the key points of the face to obtain an aligned face image; and performing face data normalization and data format conversion on the aligned face image to obtain the standardized input image.

18. The method for face recognition according to claim 14, further comprising:

selecting a highest similarity and a second highest similarity from all the candidate similarities; in response to that there is only one candidate similarity, the highest similarity is equal to the candidate similarity, and the second highest similarity is 0; in response to that the highest similarity is greater than a specified first threshold, and the second highest similarity is lower than a specified second threshold, the feature vector to be detected and the prestored facial feature set are sent as input, wherein the first threshold is not less than the second threshold;

after receiving the input, in response to that a number of feature vectors stored in the prestored facial feature set does not reach a preset upper limit for the number of feature vectors, directly adding the feature vector to be detected to the prestored facial feature set; in response to that the number of stored feature vectors has reached the upper limit for the number of feature vectors, each of the prestored feature vectors in the prestored facial feature set, except one or more front facial feature vectors, is replaced with the feature vector to be detected in turn; a candidate facial feature set is obtained by each replacement; a diversity score for each of the candidate facial feature set is calculated by the feature diversity evaluation module, and a candidate facial feature set with the highest score is selected therefrom; in response to that the diversity score for the candidate facial feature set with the highest score is higher than the diversity score for the original prestored facial feature set, the candidate facial feature set with the highest score is taken as a new prestored facial feature set; in response to that the diversity score for the candidate facial feature set with the highest score is not higher than the diversity score for the original prestored facial feature set, the prestored facial feature set is not updated; and obtaining a diversity score for the prestored facial feature set or the candidate facial feature set.

19. The method for face recognition according to claim 18, further comprising:

taking the prestored facial feature set or the candidate facial feature set as a vector group, and then obtaining the diversity score in one of the following three manners:

manner 1) taking a mean Euclidean distance between each feature vector in the vector group and a mean vector of all feature vectors in the vector group as the diversity score;

manner 2) taking a mean of all vector similarities between any two of all feature vectors in the vector group as the diversity score; and manner 3) training a shallow neural network to generate the diversity score of the vector group.

20. The method for face recognition according to claim 14, further comprising:

calculating the candidate similarity in one of the following two manners:

manner 1) taking a weighted mean of the vector similarities between the feature vector to be detected and each of the prestored feature vectors in the prestored facial feature set as the candidate similarity between the feature vector to be detected and the prestored facial feature set; and manner 2) taking a maximum of the vector similarities between the feature vector to be detected and each of the prestored feature vectors in the prestored facial feature set as the candidate similarity between the feature vector to be detected and the prestored facial feature set.

\* \* \* \* \*